United States Patent Office 3,073,814
Patented Jan. 15, 1963

3,073,814
TRIIODOBENZOIC ACID DERIVATIVES
Philip E. Wiegert, St. Louis, and Robert D. Rands, Jr., and Douglas W. Chapman, Greendale, Mo., assignors to Mallinckrodt Chemical Works, St. Louis, Mo., a corporation of Missouri
No Drawing. Filed July 25, 1960, Ser. No. 44,849
8 Claims. (Cl. 260—211)

This invention relates to organic compounds and more particularly to certain novel trisubstituted formamidines.

Briefly, the present invention is directed to substituted formamidines of the formula:

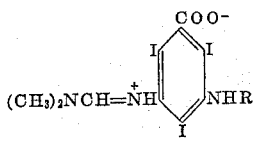

where R is the methanesulfonyl radical or a lower carboxylic acyl radical, and salts thereof with pharmaceutically acceptable cations.

Among the objects of the invention may be mentioned the provision of new substituted formamidines; the provision of new benzoic acid derivatives; the provision of new iodinated compounds; the provision of new dimethylaminomethyleneamino benzoic acids; and the provision of compounds of the type indicated which are useful for the preparation of roentgenographic contrast media. Other objects of the invention and features will be in part apparent and in part pointed out hereinafter.

The invention accordingly comprises the products hereinafter described, the scope of the invention being indicated in the following claims.

The present invention is directed to the novel substituted formamidino iodinated benzoic acids represented by the formula:

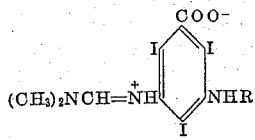

where R is the methanesulfonyl radical or a lower carboxylic acyl radical, and salts thereof with pharmaceutically acceptable cations.

As examples of lower carboxylic acyl radicals, there may be mentioned the formyl, acetyl, and propionyl radicals. Examples of salts with pharmaceutically acceptable cations include the alkali metal, especially sodium, salts as well as N-methylglucamine and diethanolamine salts. Additional examples of lower carboxylic acyl radicals and salts with pharmaceutically acceptable cations will be obvious to those skilled in the art.

Infrared spectra indicate that these new compounds exist in the form of an inner salt or Zwitter-ion, as set forth in the structure shown above.

The novel compounds of the invention may be prepared by the condensation of N,N-dimethylformamide with a 3-lower alkanamido- or 3-methylsulfonamido-amino-2,4,6-triiodobenzoic acid in the presence of an acid reaction promoter, such as the acid chloride of an alkanesulfonic acid. The general reaction is known to the art.

The novel acids of the present invention are useful for the preparation of roentgenographic contrast media. For example, concentrated sterile aqueous solutions of the salts of these acids with nontoxic cations are of low toxicity and contain a high concentration of organically bound and substantially physiologically inert iodine which can be administered intravascularly. These iodinated compounds are excreted primarily by way of the urinary system. The sodium and methylglucamine salts are particularly useful for the preparation of solutions for intravascular injection in connection with vasographic techniques such as arteriography and venography. Solutions in pharmaceutically acceptable solvents other than water are also useful for special purposes.

Dispersions of water insoluble derivatives of these acids, such as their esters, are also useful, as for example in visualizing hollow organs and cavities having external orifices through which the contrast preparation can be introduced prior to the examination and removed after the examination is completed.

The compounds are also useful for the preparation of other types of contrast media such as for example, non-aqueous dispersions.

The following examples illustrate the invention.

EXAMPLE 1

3-Acetamido-5-Dimethylaminomethylene-Amino-2,4,6-Triiodobenzoic Acid 3-acetamido-5-amino-2,4,6-triiodobenzoic acid [Larsen et al., JACS 78, 3210–16 (1956)] (57 g., 0.1 mole) was dissolved with the aid of heat in dimethylformamide (150 ml.). The solution was cooled to room temperature and ethanesulfonyl chloride (10.5 ml., 0.1 mole) was added. The solution was swirled and set aside for 2 hours, after which 200 ml. of water was added, the mixture chilled and the crude product collected (yield, 37%). The crude product was dissolved in sodium hydroxide solution and reprecipitated by the addition of acetic acid. The separated 3-acetamido-5-dimethylaminomethylene-amino-2,4,6-triiodobenzoic acid melted with decomposition at 284.6° C. (corrected). Calculated for $C_{12}H_{12}I_3N_3O_3$:

Neutral equivalent (N.E.), 627; iodine (I), 60.7%. Found: N.E., 636; I, 60.6%. The structure was verified by means of the infrared spectrum.

EXAMPLE 2

3-Acetamido-5-Dimethylaminomethyleneamino-2,4,6-Triiodobenzoic Acid, Sodium Salt 3-acetamido-5-dimethylaminomethyleneamino-2,4,6-triiodobenzoic acid (3.95 g., .0063 mole) was dissolved in an equivalent quantity of sodium hydroxide solution. The solution was evaporated to dryness to yield the sodium salt of 3-acetamido-5-dimethylaminomethylenamino-2,4,6-triiodobenzoic acid. Its solubility in water at 25° C. is approximately 97 grams per 100 ml. of solution.

A solution of this salt containing 300 mg. I/ml. was prepared. 0.1% methyl paraben was added as a preservative and the solution was pasturized.

The acute $LD_{50}$ of the sodium salt, determined by intravenous injection of this solution, in male albino mice was found to be approximately 14.1 g./kg.

EXAMPLE 3

3-Acetamido-5-Dimethylaminomethyleneamino-2,4,6-Triiodobenzoic Acid, N-Methylglucamine Salt The N-methylglucamine salt of 3-acetamido-5-dimethylaminomethyleneamino-2,4,6-triiodobenzoic acid was prepared by a process generally similar to that described in Example 2, an equivalent quantity of N-methylglucamine being substituted for the sodium hydroxide there specified.

EXAMPLE 4

*3-Methylsulfonamido-5-Dimethylaminomethyleneamino-2,4,6-Triiodobenzoic Acid*

3-methylsulfonamido-5-amino-2,4,6-triiodobenzoic acid was prepared by the method described in the copending, coassigned application Serial No. 746,072 of De La Mater and Wiegert, filed July 2, 1958, now Patent 3,036,063, dated May 22, 1962. In this synthesis a dioxane solution of 3-amino-5-nitrobenzoic acid containing a small amount of pyridine is treated with methanesulfonyl chloride to form 3-methylsulfonamido-5-nitrobenzoic acid. The nitro group is reduced by catalytic hydrogenation and the resulting 3-methylsulfonamido-5-aminobenzoic acid is exhaustively iodinated in acid solution by means of iodine monochloride.

The resulting 3 - methylsulfonamido-5-amino-2,4,6-triiodobenzoic acid (60 g., 0.0988 mole), was dissolved in dimethylformamide. The solution was cooled to room temperature and ethanesulfonyl chloride (10.5 ml., 0.109 mole) was added. The solution was swirled and set aside. The temperature slowly rose to about 38° C. and then slowly dropped. After 2 hours, 200 ml. of water was added, the solution was cooled in an ice bath and the crystalline product (52% yield) was collected. The crystals were dissolved in sodium hydroxide solution, which was then acidified with acetic acid (pH 5–7) yielding colorless crystals of 3-methylsulfonamido-5-dimethylaminomethyleneamino-2,4,6-triiodobenzoic acid, melting with decomposition at 248–249° C. (corrected). The structure was verified by means of the infrared spectrum.

EXAMPLE 5

*3-Methylsulfonamido-5-Dimethylaminomethyleneamino-2,4,6-Triiodobenzoic Acid, Sodium Salt*

3 - methylsulfonamido - 5 - dimethylaminomethyleneamino-2,4,6-triiodobenzoic acid (4.0 g., 0.0060 mole) was dissolved in sufficient sodium hydroxide solution to produce a solution of pH 7–8. The solution was concentrated until crystals of the sodium salt of 3-methylsulfonamido - 5 - dimethylaminomethyleneamino-2,4,6-triiodobenzoic acid separated. A measured portion of the supernatant liquid, saturated at 25° C. was evaporated to dryness. From the weight of the dry residue the indicated solubility of the salt is approximately 82 g./100 ml. of solution.

An aqueous solution of the salt was prepared to contain 300 mg. I/ml., 0.1% of methyl paraben was added as a preservative, and the solution was pasteurized. The acute $LD_{50}$ of the sodium salt as determined by intravenous injection of this solution in male albino mice was found to be approximately 11.2 g./kg.

EXAMPLE 6

*3-Methylsulfonamido-5-Dimethylaminomethyleneamino-2,4,6-Triiodobenzoic Acid, N-Methylglucamine Salt*

Sufficient N-methylglucamine was added to a slurry of 3 - methylsulfonamido - 5-dimethylaminomethyleneamino-2,4,6-triiodobenzoic acid to provide a solution of pH 7–8 containing 300 mg. I/ml. 0.1% methyl paraben was added and the solution was pasteurized.

In addition to the compounds disclosed in the preceding examples it is contemplated that the invention includes other 3-lower alkanamido-5-dimethylaminomethyleneamino-2,4,6-triiodobenzoic acids, such as the 3-propionamido and 3-butyramido homologues. These homologues may be prepared by the methods illustrated in the foregoing examples. Moreover, the inclusion of other salts with pharmaceutically acceptable cations, such as the diethanolamine salts of the acids of the invention is also contemplated.

In view of the above it will be seen that the several objects of the invention are achieved and other advantageous results attained.

As many changes can be made in the above products without departing from the scope of the invention it is intended that all matter contained in the above description shall be interpreted as illustrative and not in a limiting sense.

We claim:
1. Trisubstituted formamidine of the formula:

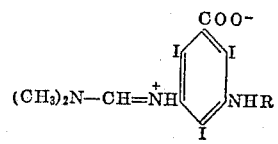

where R is selected from the group consisting of methanesulfonyl and lower carboxylic acyl radicals, and salts thereof with pharmaceutically acceptable cations.

2. 3 - methylsulfonamido - 5 - dimethylaminomethyleneamino-2,4,6-triiodobenzoic acid.

3. The sodium salt of 3-methylsulfonamido-5-dimethylaminoethyleneamino-2,4,6-triiodobenzoic acid.

4. The N-methylglucamine salt of 3-methylsulfonamido-5-dimethylaminomethyleneamino-2,4,6-triiodobenzoic acid.

5. 3 - lower alkanamido - 5 - dimethylaminomethyleneamino-2,4,6-triiodobenzoic acid.

6. 3 - acetamido - 5 - dimethylaminomethyleneamino-2,4,6-triiodobenzoic acid.

7. The sodium salt of 3-acetamido-5-di-methylaminomethyleneamino-2,4,6-triiodobenzoic acid.

8. The N-methylglucamine salt of 3-acetamido-5-dimethylaminomethyleneamino-2,4,6-triiodobenzoic acid.

References Cited in the file of this patent

FOREIGN PATENTS 205,584   Australia _____ Jan. 18, 1957